United States Patent
Brown et al.

(10) Patent No.: US 7,397,990 B2
(45) Date of Patent: Jul. 8, 2008

(54) SIGNAL TRANSMITTING CABLE

(75) Inventors: George Henry Platt Brown, Galashiels (GB); David John Stockton, Woodbridge (GB); Kevin Thomas Cockburn, Jedburgh (GB); Greig Iain McIlwraith, Kelso (GB)

(73) Assignee: Emtelle (UK) Limited, Hawick (GB)

( * ) Notice: Subject to any disclaimer, the term of this patent is extended or adjusted under 35 U.S.C. 154(b) by 0 days.

(21) Appl. No.: 10/522,098

(22) PCT Filed: Jun. 26, 2003

(86) PCT No.: PCT/GB03/02749

§ 371 (c)(1),
(2), (4) Date: Dec. 21, 2005

(87) PCT Pub. No.: WO2004/015465

PCT Pub. Date: Feb. 19, 2004

(65) Prior Publication Data

US 2006/0140556 A1    Jun. 29, 2006

(30) Foreign Application Priority Data

Aug. 10, 2002  (GB) .................................. 0218624.5
Sep. 26, 2002  (GB) .................................. 0222256.0
Jun. 6, 2003   (GB) .................................. 0313017.6

(51) Int. Cl.
    *H01B 11/22*  (2006.01)
(52) U.S. Cl. ........................ 385/101; 385/106; 385/111

(58) Field of Classification Search ................. 385/100, 385/101, 106, 111, 112, 128
See application file for complete search history.

(56) References Cited

U.S. PATENT DOCUMENTS

| | | | | |
|---|---|---|---|---|
| 4,523,804 | A | * | 6/1985 | Thompson ................... 385/107 |
| 4,892,442 | A | * | 1/1990 | Shoffner ................... 405/183.5 |
| 5,109,456 | A | * | 4/1992 | Sano et al. .................. 385/100 |
| 5,274,725 | A | | 12/1993 | Bottoms, Jr. et al. ........ 385/105 |
| 5,418,878 | A | | 5/1995 | Sass et al. .................... 385/101 |
| 5,539,851 | A | | 7/1996 | Taylor et al. ................. 385/101 |
| 5,787,217 | A | | 7/1998 | Traut et al. .................. 385/106 |
| 6,205,277 | B1 | * | 3/2001 | Mathis et al. ............... 385/106 |

(Continued)

FOREIGN PATENT DOCUMENTS

DE    42 11 489    7/1993

(Continued)

*Primary Examiner*—Chau N Nguyen
(74) *Attorney, Agent, or Firm*—Zilka-Kotab, PC

(57) ABSTRACT

A cable (302) has (8) fibers (304) are encapsulated by a UV curable layer (306) having a diameter of approximately (1010) microns, and (16) outer fibers (316) arranged in a circular formation around the inner fibers (304). The optical fibers (304) are held in position by means of the UV curable layer (306) so that the UV curable material of the layer (306) does not penetrate into the gaps between the optical fibers (304) and the outermost optical fibers (304) are restrained by the layer from moving axially. It is found that such an arrangement provides surprisingly favorable bending properties, making the cable particularly suitable for installation in a tube by means of blowing.

15 Claims, 7 Drawing Sheets

U.S. PATENT DOCUMENTS

| | | | |
|---|---|---|---|
| 6,240,230 B1 * | 5/2001 | Szum | 385/100 |
| 6,334,015 B2 | 12/2001 | Jamet | 385/102 |
| 6,389,204 B1 | 5/2002 | Hurley | 385/102 |
| 6,801,696 B2 * | 10/2004 | Davis et al. | 385/109 |

FOREIGN PATENT DOCUMENTS

| | | |
|---|---|---|
| EP | 0 521 710 | 1/1992 |
| EP | 0 553 990 | 1/1993 |
| EP | 1 310 814 | 11/2002 |
| GB | 2074753 | 11/1981 |
| GB | 2183895 | 6/1987 |
| GB | 2256499 | 12/1992 |
| GB | 2262358 | 6/1993 |
| GB | 2360853 | 10/2001 |

* cited by examiner

SIGNAL TRANSMITTING CABLE

RELATED APPLICATION(S)

The present application claims the priority of a United Kingdom patent application filed Aug. 10, 2002 under application number 0218624.5, United Kingdom patent application filed Sep. 26, 2002 under application number 0222256.0, and United Kingdom patent application filed Jun. 6, 2003 under application number 0313017.6, all of which are incorporated by reference.

FIELD OF THE INVENTION

The present invention relates to signal transmitting cables, and relates particularly, but not exclusively, to optical fibre signal transmitting cables.

BACKGROUND OF THE INVENTION

Optical fibres have traditionally been installed into underground ducts by attaching a pulling member to one end of the cable, and winching the cable into the duct. As a result, such cables were large and heavily reinforced to protect the relatively delicate optical fibre elements from damage during installation.

Traditional cables were constructed by first manufacturing sub-assemblies comprising tubes manufactured from thermoplastic materials and containing typically twelve fibre optic elements. A number of these tubes were then assembled together by stranding them around a central strength member. The stranding process, and the fact that the tube is large relative to the space occupied by the fibre optic elements, means that all fibres experience the same strain when the cable is bent during installation, and the loose tube construction allows the fibres to move and accommodate the strain, resulting in minimal signal losses.

More recent techniques for cable installation involve blowing the cable into a duct by means of compressed air, for example as described in EP 0108590. This blowing process distributes the installation force along the entire length of the cable within the duct, as a result of which the installation force at the leading end of the cable can be reduced, and much of the reinforcement can therefore be removed from the cable. This provides significant advantages, since there is an increasing requirement for cables to become more compact, primarily because city networks are congested and providing new underground ducts in cities is expensive and involves substantial disruption.

Installation of cables by blowing involves both the use of fluid drag operating on the sheath of the cable, and a pushing force, usually generated by drive rollers or a caterpillar pushing device which forms part of the blowing equipment. At the initial stages of installation, there is very little cable installed in the tube, and the effect of fluid drag is therefore small compared to the pushing effect. As more of the cable is installed, the installation force derived from the fluid drag becomes more significant.

It is therefore desirable for cables designed for installation by blowing to have adequate stiffness to facilitate the initial pushing requirement. In the case of cables constructed from sub-assemblies, the fibres are loosely contained in an outer sheath of the sub-assembly. Because the individual fibres are not constrained, they do not provide the cable with sufficient stiffness, and it is therefore desirable that the cable be constructed with a central strength member, typically manufactured using a glass-reinforced polymer. The strength member is sufficiently stiff that it dominates the stiffness of the assembly and, because of its central location, ensures that the cable does not preferentially bend in one direction rather than another.

However, the use of a central strength member undesirably increases the size of the cable.

An attempt to produce a cable for installation by blowing without the use of a central strength member is disclosed in EP 0521710, which describes a cable in which 2, 4 or 8 individual optical fibres are in touching contact and are encapsulated in an outer layer, typically a UV cured acrylate. Encapsulation of the fibres in a UV cured acrylate results in the individual fibres being restrained from moving relative to each other, and the cable derives its stiffness from this, eliminating the requirement for the central strength member. However, the fact that the fibres are locked together means that when the assembly is bent, the fibres impose a strain on the outer coating of the cable. The larger the diameter of the fibre unit, the greater the tensile stress applied to the outer surface for a given bend radius. Fibre optic cables containing 4 or 8 fibres are found to create such a high load that a phenomenon known as fibre breakout is experienced, and which has a detrimental effect on cable performance.

EP 0521710 discloses a process which produces satisfactory results on cables with fibre counts of 2, 4 and 8 fibres by changing the coating arrangement to ensure that fibres do not break out of the coating, even with larger diameter cables containing 8 fibres. However, it is desirable to manufacture cables having more than 8 fibres, but attempts to manufacture such cables have had difficulty in overcoming the problem of fibre breakout. An attempt to overcome this problem is disclosed in EP 0422764 in which 12 fibres are provided, the fibres being accurately located and locked in position relative to each other by first assembling sets of 4 fibres into a ribbon sub-assembly by edge bonding the 4 fibres to each other, and laying 3 such sub-assemblies on top of each other to form a basic construction which is then encapsulated in an outer layer.

Compact ribbon cable assemblies of this type suffer from the drawback that the surfaces of the ribbons in such cables are smooth, and the ribbons are therefore free to slide relative to each other. In addition, because the fibres are bonded in a flat arrangement, when the cable is bent in a direction which imposes a sideways moment on the flat ribbons, the force generated is high and the central ribbon, which is free to slide between the two outer ribbons, is then forced to break out through the outer acrylate coating, producing micro bending and unacceptable signal losses.

An attempt to overcome this problem is disclosed in DE 4211489 by reducing the diameter of the individual optical fibres. An individual fibre is provided with a protective outer layer of 25 microns or less, instead of the 60 micron coating usually applied. This reduces the overall diameter of the individual fibres by approximately 30%, which has the effect of making the assembly smaller and therefore reducing the strain imposed on the coating. However, this arrangement is inconvenient because most commercially available fibres have the same dimensions, and equipment for splicing and terminating fibres is therefore adapted to these standard dimensions. Furthermore, DE 4211489 describes an arrangement in which adjacent fibre ribbons are offset to reduce the height of the assembly. Such ribbon constructions produce assemblies with a very high preference to bend in one direction, and are therefore not suitable for cables designed for installation by blowing.

U.S. Pat. No. 5,787,212 discloses an arrangement of 7 fibres of equal diameter in which 6 fibres are disposed in a circular pattern in touching contact with each other and around a central fibre. When the fibres are coated with resin curable by UV radiation, the touching fibres ensure that resin does not enter the spaces between the fibres, which minimises the problem of UV light not adequately penetrating the outer fibres and inadequately curing resin located between the fibres. Uncured resin has the potential to break down and generate agents which may damage the glass fibres, adversely affecting their long-term signal transmitting performance.

Although the arrangement of U.S. Pat. No. 5,787,212 has very good bending properties, since it is completely balanced with no preferential bending characteristics, and strain imposed on one fibre is partially distributed into the other fibres by virtue of the touching contact, groups of 7 fibres are not used commercially, since fibres are almost always deployed in pairs and it is desirable to manufacture cables with higher fibre counts suitable for installation by blowing. Traditional cables almost exclusively contain 12 fibres or multiples thereof.

Preferred embodiments of the present invention seek to overcome the above disadvantages of the prior art.

SUMMARY OF THE INVENTION

According to an aspect of the present invention, there is provided a signal transmitting cable comprising a first signal transmitting portion including a plurality of elongate, flexible first signal transmitting members, wherein the first signal transmitting members are surrounded by a first layer of resin material curable by means of radiation such that only the outermost signal transmitting members are in contact with said first layer, and said first signal transmitting members are arranged to form at least three rows, wherein for each said row containing a plurality of said members, said members are arranged such that neighbouring members of a row are in touching contact with each other, each recess formed by neighbouring members of a first said row facing towards a second said row accommodates a respective member of said second row, and said first layer is in touching contact with substantially all of the outward facing surface of the first signal transmitting portion.

By providing a cable in which only the outermost signal transmitting members are in contact with the first layer and recesses formed by neighbouring members of a first row accommodate members of a second row, this provides the advantage of enabling relative movement of the optical fibres to be restrained to give the cable sufficient stiffness, while allowing sufficient axial sliding of the optical fibres relative to each other to minimise the application of stress to the optical fibres when the cable is bent.

The first signal transmitting portion may include 12 said first signal transmitting members arranged in 4 rows having 2, 3, 4 and 3 signal transmitting members respectively.

It is found that a cable having a signal-transmitting portion containing 12 first signal-transmitting members arranged in this manner enables an optical fibre cable having surprisingly and exceptionally favourable bending properties to be constructed.

The first signal transmitting portion may include 18 said first signal transmitting members arranged in 5 rows having 2, 4, 5, 4 and 3 signal transmitting members respectively.

The first signal transmitting portion may include 24 said first signal transmitting members arranged in 5 rows having 4, 5, 6, 5 and 4 signal transmitting members respectively.

The cable may further comprise a second signal transmitting portion comprising a plurality of elongate, flexible second signal transmitting members arranged around the periphery of said first layer, wherein said external dimensions of said first layer are arranged such that each said second signal transmitting member is in touching contact with two adjacent said second signal transmitting members.

The cable may further comprise a third signal transmitting portion comprising a plurality of elongate, flexible third signal transmitting members arranged outwardly of said second signal transmitting portion.

The second signal transmitting members may be embedded in a second layer.

Said first layer may be formed of resin material cured by means of ultraviolet radiation.

An outer surface of the cable may be modified to facilitate installation into a duct by means of fluid flow.

The outer surface may be provided with ribs.

The outer surface may include at least one anti-static material.

The outer surface may include at least one friction reducing material.

The cable may further comprise an outermost layer having an inner periphery longer than the outer periphery of the layer adjacent thereto to enable removal of said outermost layer from the cable.

According to another aspect of the present invention, there is provided a method of forming a signal transmitting cable, the method comprising arranging a plurality of elongate, flexible first signal transmitting members in at least three rows, wherein for each said row containing a plurality of said members, said members are arranged such that neighbouring members of a row are in touching contact with each other, and each recess formed by neighbouring members of a first said row facing towards a second said row accommodates a respective member of a said second row;

surrounding said first signal transmitting members by a first layer of resin material curable by means of radiation such that only the outermost signal transmitting layers are in contact with said first layer, and such that said first layer is in touching contact with substantially all of the outward facing surface of the first signal transmitting portion; and curing said first layer by means of radiation.

The method may further comprise arranging a plurality of elongate, flexible second signal transmitting members around the periphery of said first layer such that each said second signal transmitting member is in touching contact with two adjacent said second signal transmitting members; and Fixing said second signal transmitting members in position;

fixing said second signal transmitting members in position relative to said first layer.

The step of fixing said second signal transmitting members in position relative to said first layer may comprise embedding said second signal transmitting members in a second layer.

BRIEF DESCRIPTION OF THE DRAWINGS

Preferred embodiments of the present invention will now be described, by way of example only and not in any limitative sense, with reference to the accompanying drawings, in which.

DETAILED DESCRIPTION

Figure 1:
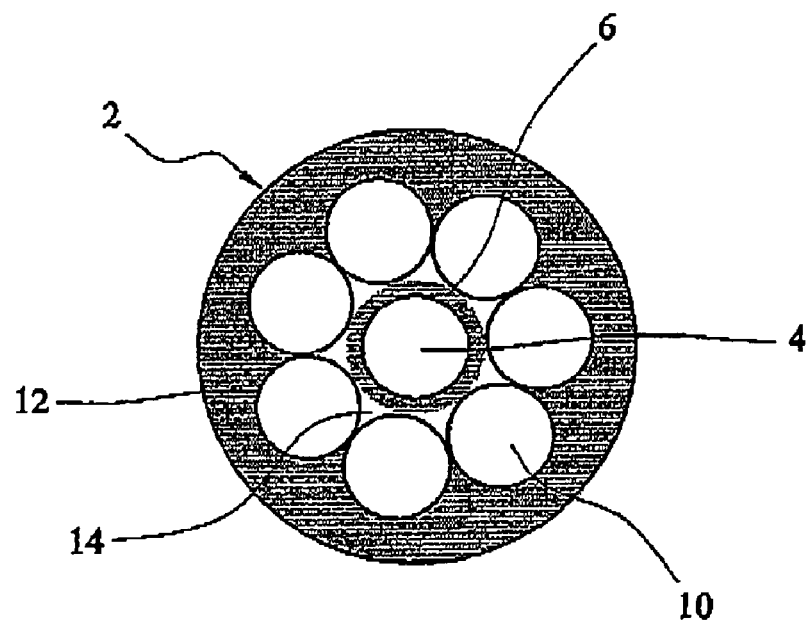
FIG. 1 is a schematic cross-sectional view of a cable not forming part of the present invention.

Referring to FIG. 1, a fibre optic cable 2 containing 8 optical fibres is constructed by coating a single central fibre 4 with a UV curable acrylate material 6 to increase the outside diameter of the coated fibre 4 from a standard commercial diameter of 245 microns to 320 microns. The diameter of 320 microns is such that 7 further optical fibres 10, of identical construction to the central fibre 4 and having a standard commercially available diameter of 245 microns, can be arranged around the circumference of the coated central fibre 4 such that each of the 7 fibres 10 is in touching contact with the coated larger diameter central fibre 4 and its two adjacent fibres 10.

The assembly is then coated with an outer layer 12 of UV curable acrylate material, the material being applied in liquid form under low pressure. Because the 7 outer fibres 10 are in contact with the coated central fibre 4 and their 2 respective neighbours 10, none of the outer fibres 10 can move during the coating process, as a result of which the acrylate material of the outer layer 12 does not penetrate into gaps 114 between the coated central fibre 4 and the outer fibres 10. This provides the advantage of avoiding insufficiently cured material in the gaps 14 in the assembly, which could otherwise have a detrimental effect on the optical performance of the cable.

The arrangement shown in FIG. 1 also has the advantage over the arrangement of EP 0521710 that the outside diameter of the 7 outer fibres 10 is 800 microns, while that of the prior art is 914 microns. This enables the finished cable to be smaller and the coating of the finished cable to contain less acrylic coating material 12 than in the prior art, the acrylic coating material 12 being generally very expensive. Furthermore, the smaller the outside diameter of the assembly, the lower the strain applied to the outer coating 12 when the cable 2 is bent. Also, because of the circular arrangement of the outer fibres 10, the assembly has no preferential bending characteristics, which optimises the cables performance during installation in a duct by fluid drag.

Figure 2:
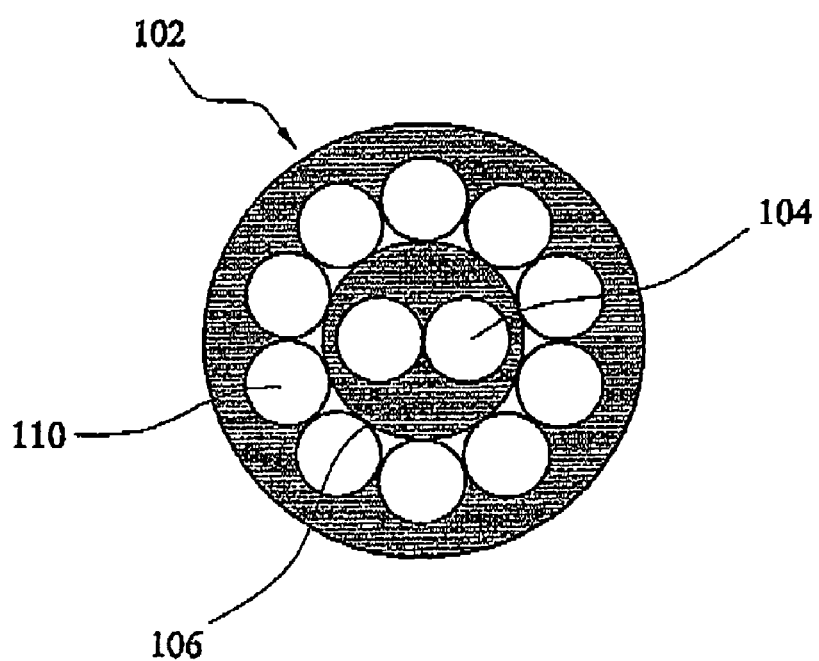
FIG. 2 is a schematic cross-sectional view of cable not forming part of the present invention.

Referring to FIG. 2, in which parts common to the arrangement of FIG. 1 are denoted by like reference numerals but increased by 100, a cable 102 is produced by arranging 10 fibres 110 around 2 inner fibres 104 which have been coated with acrylate material 106 to provide an outer diameter of 547 microns. Each of the outer fibres 110 is therefore in touching contact with the inner layer 106 and with two adjacent outer fibres 110, as a result of which UV curable acrylate forming an outer layer 112 does not penetrate into the gaps 114 inwardly of the outer fibres 110.

Figure 3:
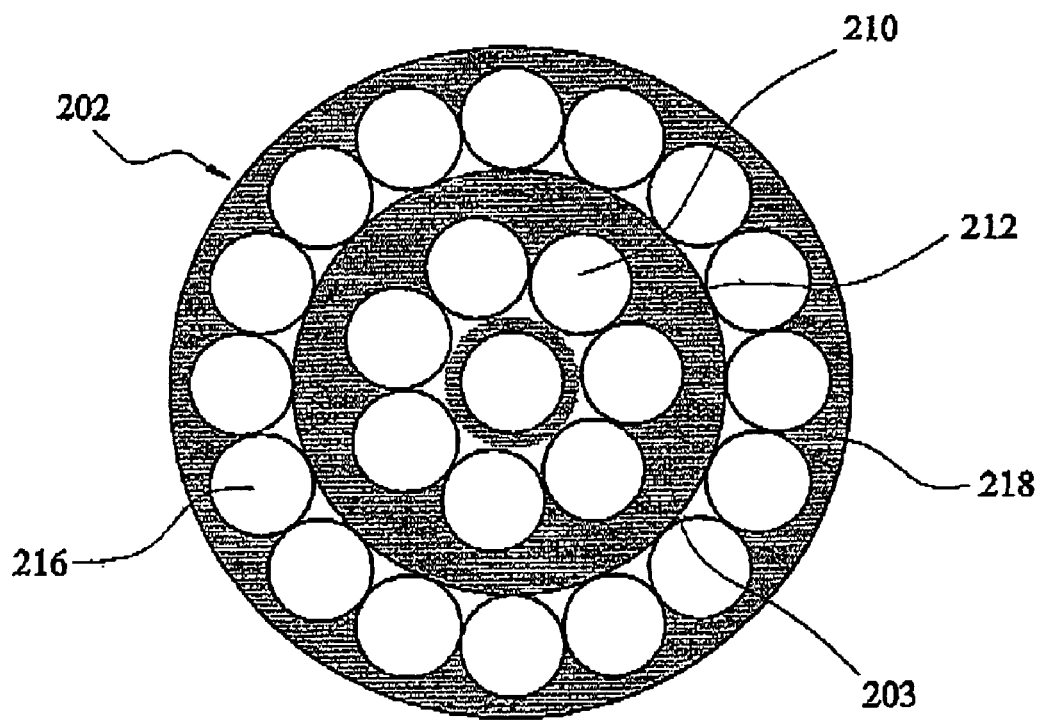
FIG. 3 is a schematic cross-sectional view of a cable not forming part of the present invention.

A further arrangement is shown in FIG. 3, in which parts common to the arrangement of FIG. 1 are denoted by like reference numerals but increased by 200. The cable 202 has a core 203 identical in construction to the cable 2 of FIG. 1, the core 203 having an outer coating 212 of outside diameter of approximately 1010 microns. This enables 16 outer optical fibres 216 to be arranged outwardly of the core 203, such that each of the outer fibres 216 is in contact with its two neighbouring fibres 216. The entire assembly is then provided with an outer coating 218 of a suitable acrylic coating to hold the outer fibres 216 in place.

It is found that as the number of layers of fibres increases, the stiffness of the assembly becomes undesirably high, as a result of which high friction generated by forcing the cable around bends impedes installation of the cable by fluid drag. Furthermore, as the diameter of the cable increases, the problem of fibre breakout occurs. This problem is alleviated by replacing the outer acrylic layer 218 of the arrangement of FIG. 3 with a thin flexible lightweight sheath, which allows the outer fibres 216 to move relative to each other. Alternatively, it is possible to encapsulate the outer fibres 216 in outer layer 218 and allow the inner fibres 210 to move relative to each other. The stiffness of the assembly can also be adjusted by selecting suitable grades of acrylic resin.

Figure 4:
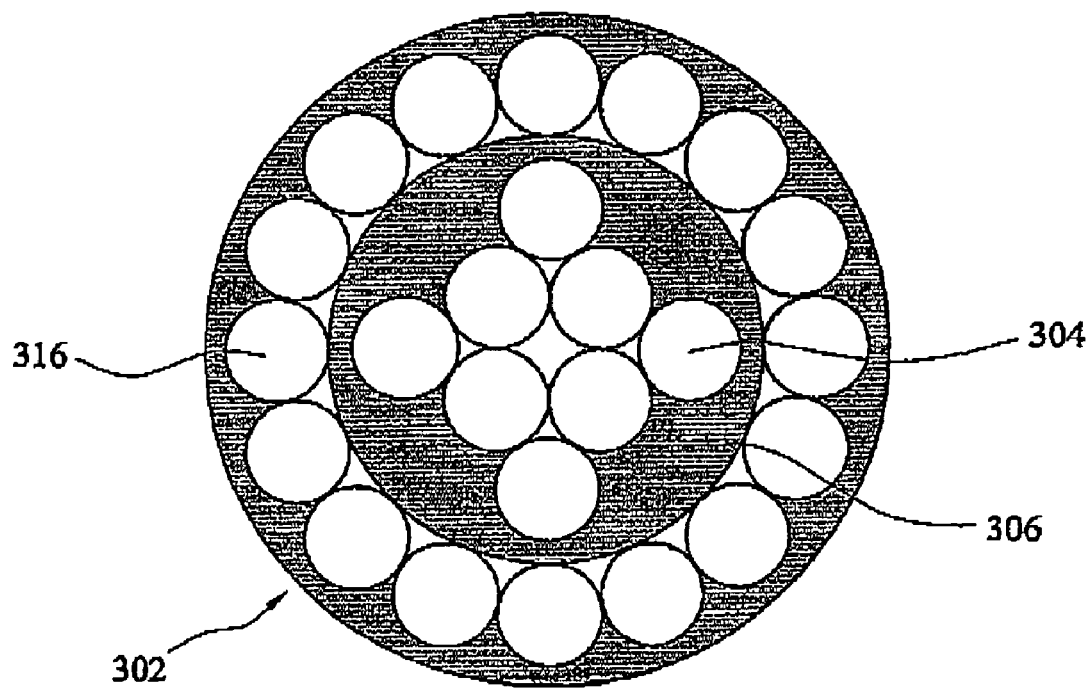
FIG. 4 is a cross-sectional view of a cable not forming part of the present invention.

A further arrangement is shown in FIG. 4, in which parts common to the arrangement of FIG. 3 are denoted by like reference numerals but increased by 100. The cable 302 has 8 fibres 304 are encapsulated by a UV curable layer 306 having a diameter of approximately 1010 microns, and 16 outer fibres 316 arranged in a circular formation around the inner fibres 304, in a manner similar to the external fibres 216 FIG. 3.

In the arrangement shown in FIG. 4, the optical fibres 304 are held in position by means of the UV curable layer 306 so that the UV curable material of the layer 306 does not penetrate into the gaps between the optical fibres 304 and the outermost optical fibres 304 are restrained by the layer from moving axially. It is found that such an arrangement provides surprisingly favourable bending properties, making the cable particularly suitable for installation in a tube by means of blowing.

Figure 5:
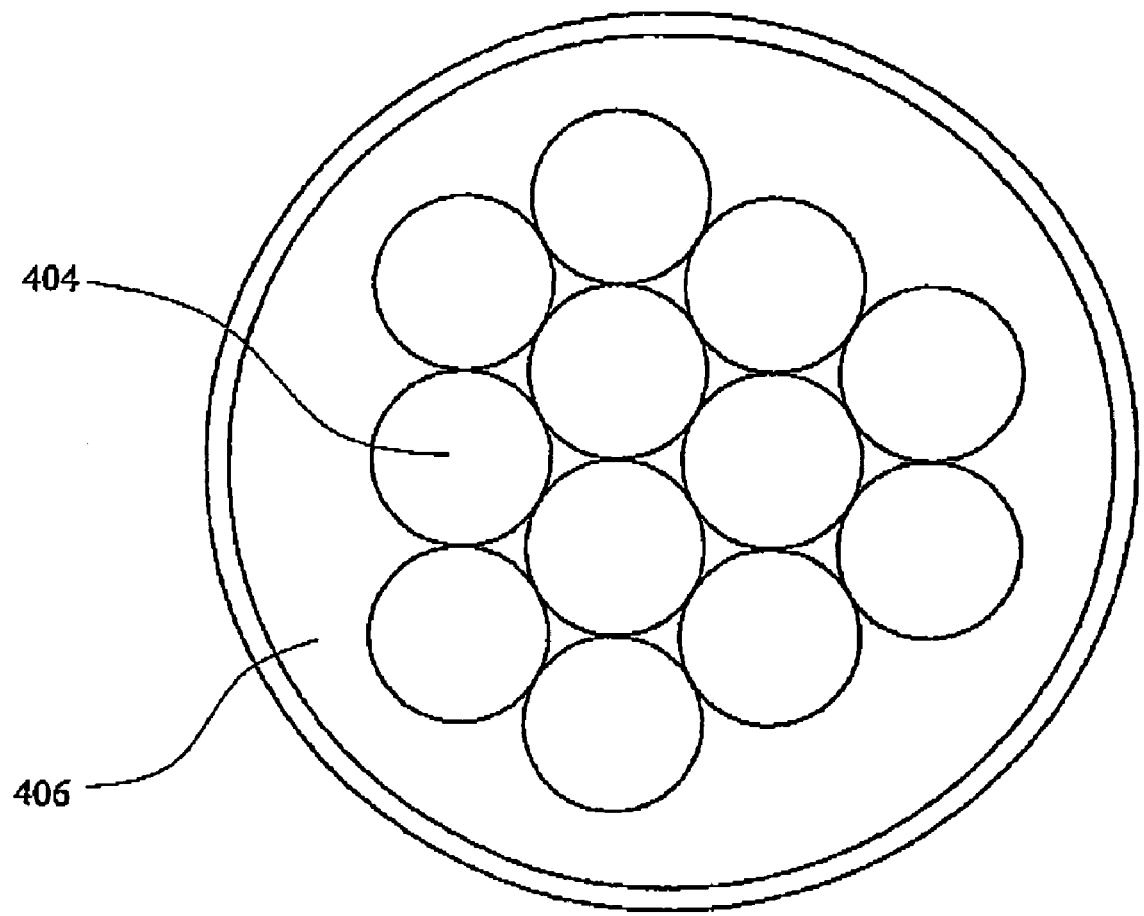
FIG. 5 is a cross-sectional view of a cable of a first embodiment of the present invention.

Exceptionally favourable bending properties are obtained in the case of 12 fibres being arranged as shown in FIG. 5, in which parts common to the arrangement of FIG. 4 are denoted by like reference numerals but increased by 100. The cable of FIG. 5 is constructed in an identical manner to the cable of FIG. 4, but the inner fibres 404 of the embodiment of FIG. 5 are arranged in rows having 2, 3, 4 and 3 fibres respectively. This cable is found to have bending properties not previously achievable in cables of 12 fibres. For example, the cable of FIG. 5 meets the bending performance requirement set out in EP 0521710, although that test is designed primarily for cables containing only 4 or 8 fibres. Advantageous bending properties are also achieved with cables constructed as in the embodiment of FIG. 5, but containing 18 fibres 404 arranged in rows of 2, 4, 5, 4 and 3 fibres, and 24 fibres 404 arranged in rows of 4, 5, 6, 5 and 4 fibres.

Figure 6:
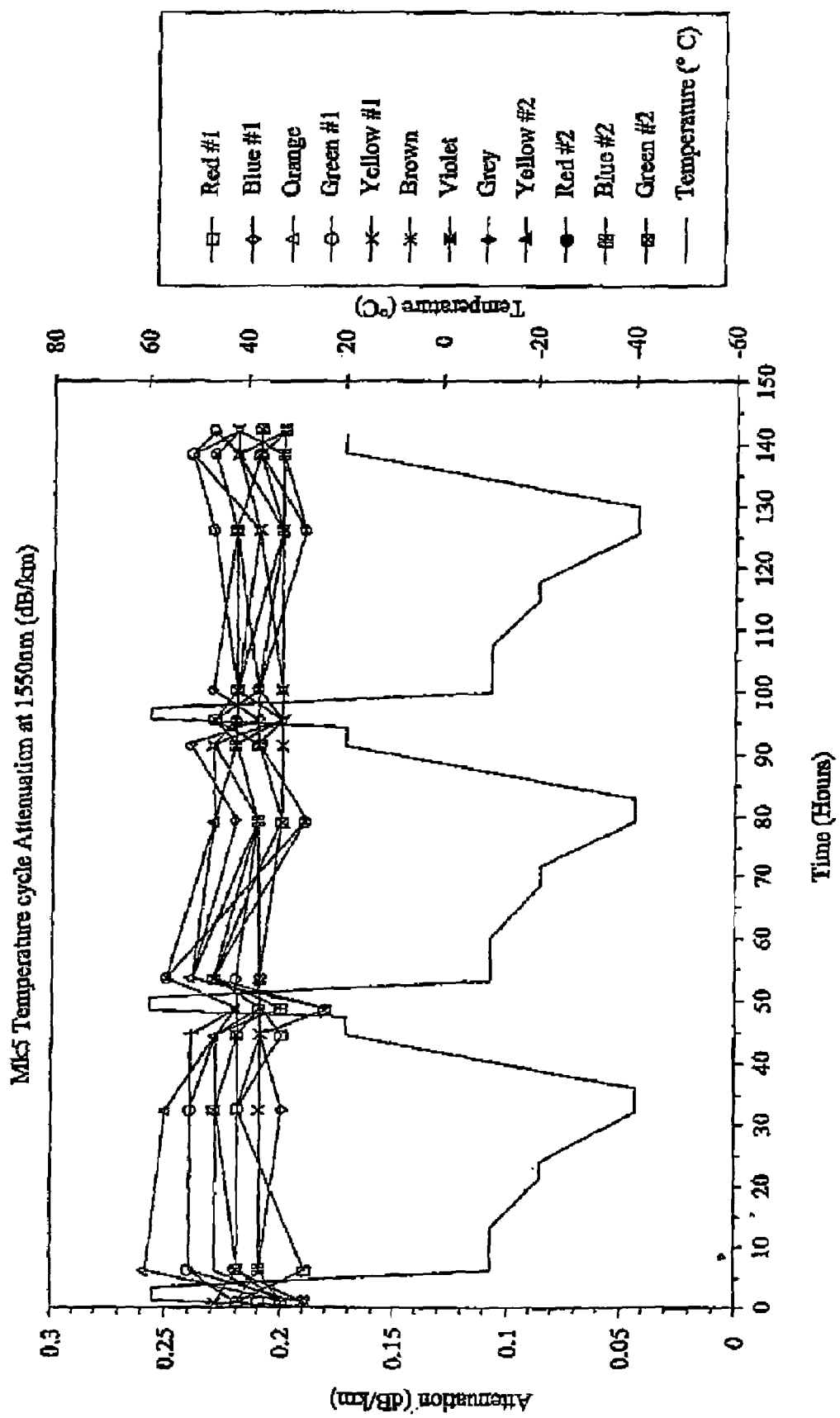
FIG. 6 illustrates optical attenuation characteristics of the cable of FIG. 5 over a wide range of temperatures.

Referring now to FIG. 6, the signal loss over a wide temperature range associated with cables of the embodiment of FIG. 5 is shown. The different curves show signal attenuation in the individual fibres 404 of the cable of FIG. 5. It can be seen that the cable can withstand exposure to a wide temperature range. This is a surprising result. Prior art cables as described in EP0157610 incorporating polyethylene outer layers display poor optical performance below approximately B20 C. This is usually attributed to a change of phase in polyethylene at around this temperature and for this reason polyethylene is not normally selected for the tight jacketing of fibre optic elements.

Figure 7:
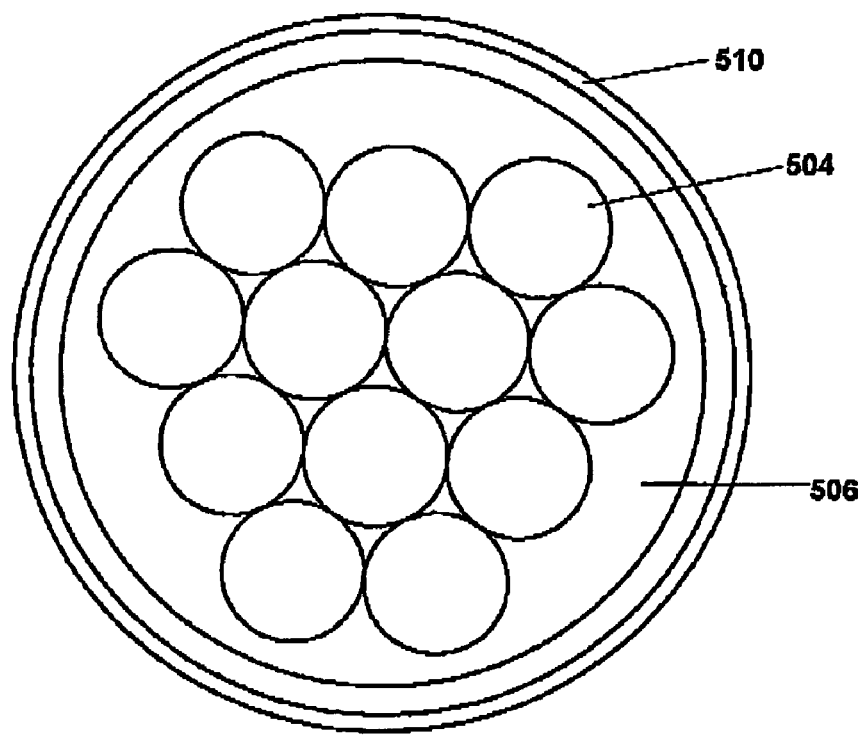
FIG. 7 is a cross-sectional view of a cable of a second embodiment of the present invention.

The cable of FIG. 7 is constructed in a similar fashion to the cable of FIG. 5, with the inner fibres 504 of the embodiment of FIG. 7 being arranged in rows having 2, 3, 4 and 3 fibres respectively, and being surrounded by a UV curable layer 506. However, the cable of FIG. 7 additionally comprises an outermost layer 510 having an inner periphery longer than the outer periphery of the layer 506.

Figure 8:
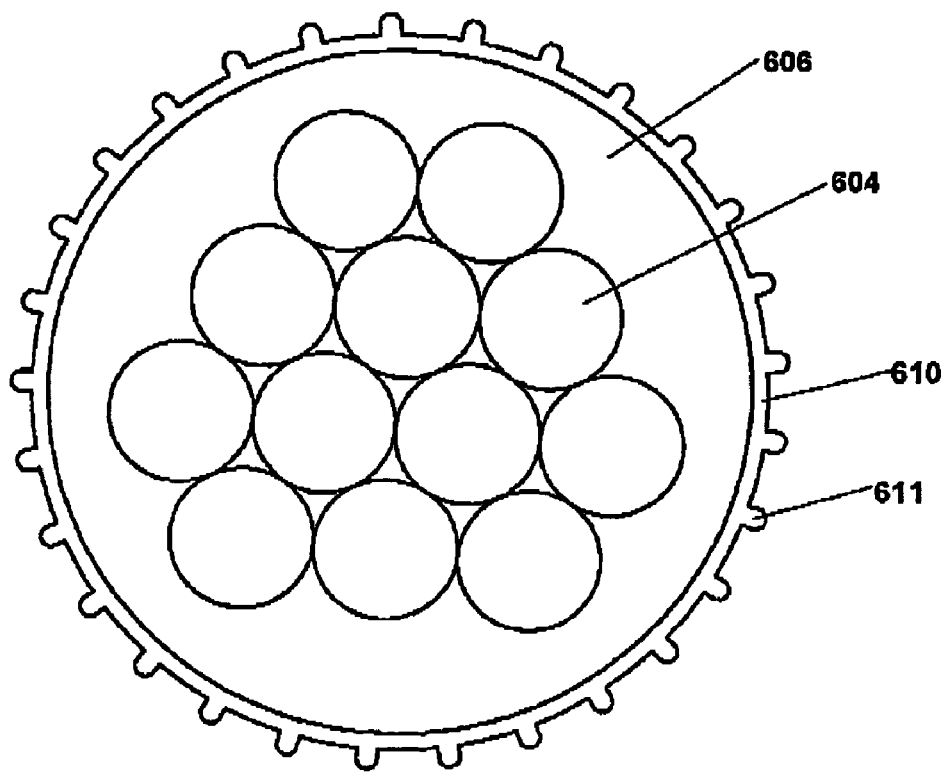
FIG. 8 is a cross-sectional view of a cable of a third embodiment of the present invention.

The cable of FIG. 8 is constructed in a similar fashion to the cable of FIG. 5, with the inner fibres 604 of the embodiment of FIG. 8 being arranged in rows having 2, 3, 4 and 3 fibres respectively, and being surrounded by a UV curable layer 606. However, the layer 606 is surrounded by an outermost layer 610 which is provided with ribs 611.

Figure 9:
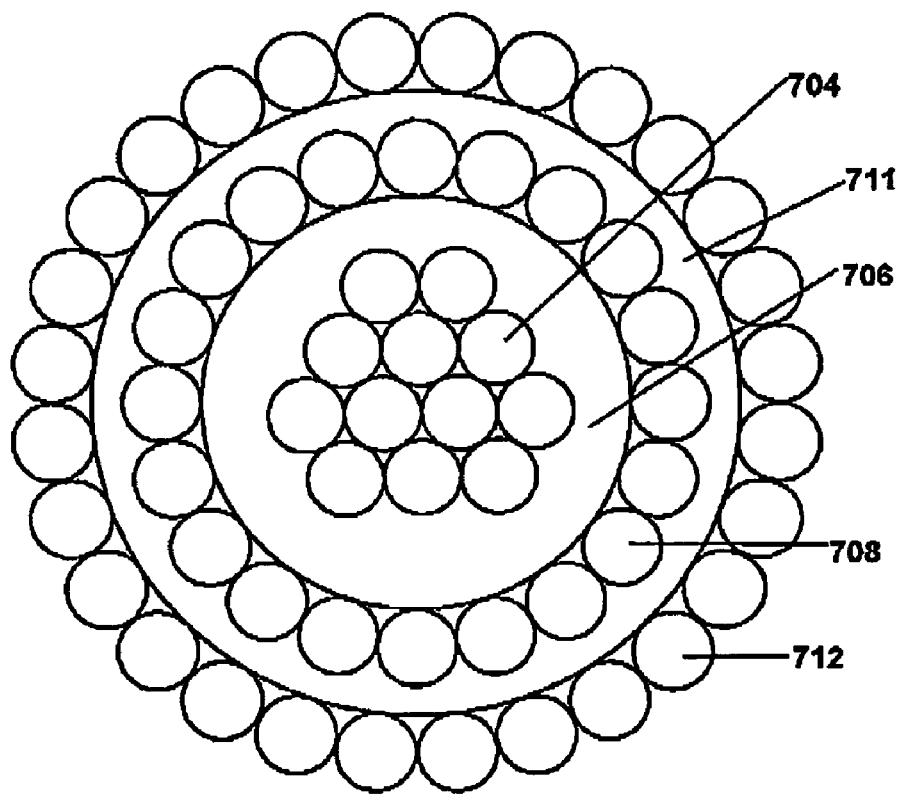
FIG. 9 is a cross-sectional view of a cable of a fourth embodiment of the present invention.

The cable of FIG. 9 is constructed in a similar fashion to the cable of FIG. 5, with the inner fibres 704 of the embodiment of FIG. 9 being arranged in rows having 2, 3, 4 and 3 fibres respectively, and being surrounded by a UV curable layer 706. However, the cable further comprises a second signal transmitting portion comprising a plurality of optical fibres 708 arranged around the periphery of the layer 706, wherein the external dimensions of the layer 706 are arranged such that each optical fibre 708 is in touching contact with two adjacent optical fibres 708. The optical fibres 708 are surrounded by a second UV curable layer 711, and the cable further comprises a third signal transmitting portion comprising a plurality of optical fibres 712 arranged outwardly of the second signal transmitting portion.

Figure 10:
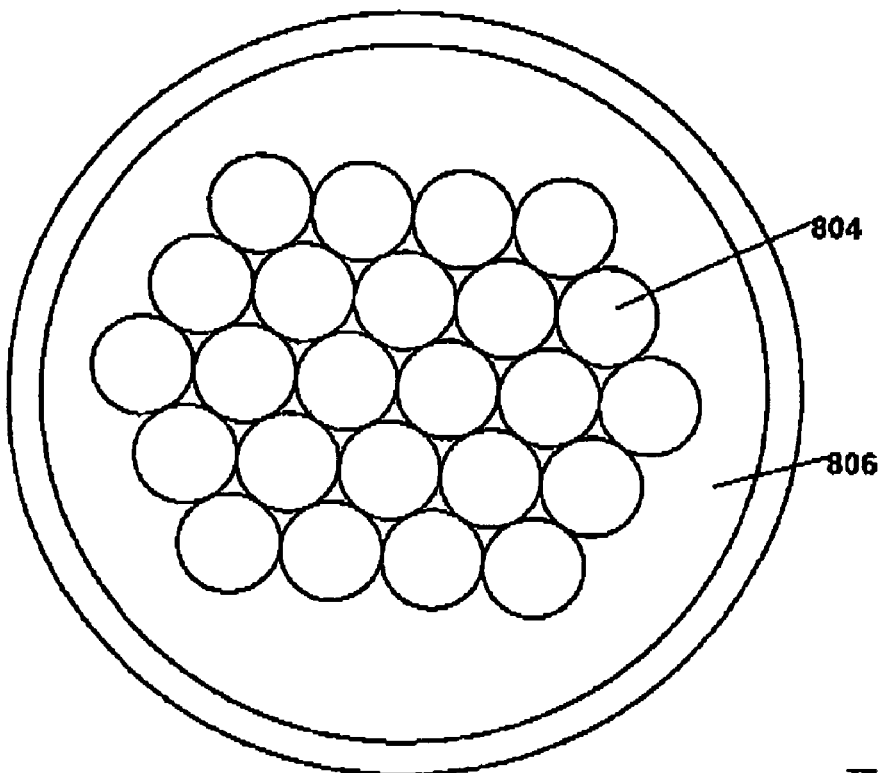
FIG. 10 is a cross-sectional view of a cable of a fifth embodiment of the present invention.

The cable of FIG. 10 is constructed in a similar fashion to the cable of FIG. 5, with the fibres 804 being surrounded by a UV curable layer 806. However, the fibres 804 of the embodiment of FIG. 10 are arranged in rows having 4, 5, 6, 5 and 4 fibres respectively.

Figure 11:
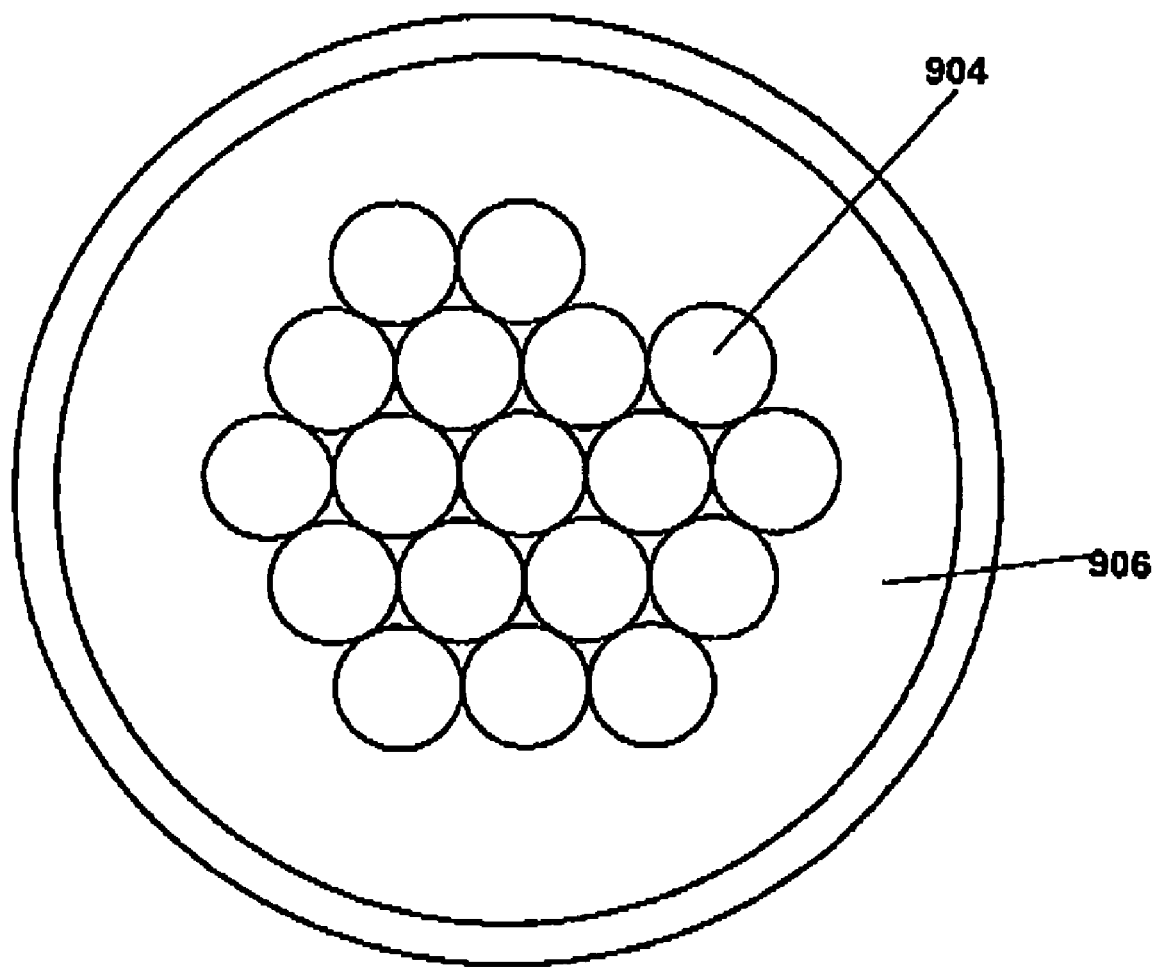
FIG. 11 is a cross-sectional view of a cable of a sixth embodiment of the present invention.

The cable of FIG. 11 is constructed in a similar fashion to the cable of FIG. 5, with the fibres 904 being surrounded by a UV curable layer 906. However, the fibres 904 of the embodiment of FIG. 11 are arranged in rows having 3, 4, 5, 4 and 2 fibres respectively.

It will be appreciated by persons skilled in the art that the above embodiments have been described by way of example only, and not in any limitative sense, and that various alterations and modifications are possible without departure from the scope of the invention as defined by the appended claims.

The invention claimed is:

1. A signal transmitting cable for installation into a tube by means of blowing by compressed fluid, the cable comprising a first signal transmitting portion including a plurality of elongate, flexible first optical signal transmitting members, wherein the first optical signal transmitting members of the first signal transmitting portion are surrounded by a first layer of resin material curable by means of radiation such that only the outermost optical signal transmitting members are in contact with said first layer, and said first optical signal transmitting members are arranged to form at least three rows, wherein for each said row containing a plurality of said members, said members are arranged such that neighbouring members of said row are in touching contact with each other, each recess formed by neighbouring members of a first said row facing towards a second said row accommodates a respective member of said second row, said first layer is in touching contact with substantially all of the outward facing surface of the first signal transmitting portion, and wherein a material forming an outer surface of the cable is modified to facilitate installation into a duct by means of fluid flow.

2. A cable according to claim 1, wherein the first signal transmitting portion includes 12 said first optical signal transmitting members arranged in 4 rows having 2, 3, 4 and 3 optical signal transmitting members respectively.

3. A cable according to claim 1, wherein the first signal transmitting portion includes 18 said first optical signal transmitting members arranged in 5 rows having 2, 4, 5, 4 and 3 optical signal transmitting members respectively.

4. A cable according to claim 1, wherein the first signal transmitting portion includes 24 said first optical signal transmitting members arranged in 5 rows having 4, 5, 6, 5 and 4 optical signal transmitting members respectively.

5. A cable according to claim 1, wherein said first layer is formed of resin material cured by means of ultraviolet radiation.

6. A cable according to claim 1, further comprising a second signal transmitting portion comprising a plurality of elongate, flexible second optical signal transmitting members arranged around the periphery of said first layer, wherein said external dimensions of said first layer are arranged such that each said second optical signal transmitting member is in touching contact with two adjacent said second optical signal transmitting members.

7. A cable according to claim 6, further comprising a third signal transmitting portion comprising a plurality of elongate, flexible third optical signal transmitting members arranged outwardly of said second signal transmitting portion.

8. A cable according to claim 6, wherein said second optical signal transmitting members are embedded in a second layer.

9. A cable according to claim 1, wherein said outer surface is provided with ribs.

10. A cable according to claim 1, wherein said outer surface includes at least one anti-static material.

11. A cable according to claim 1, wherein said outer surface includes at least one friction reducing material.

12. A cable according to claim 1, further comprising an outermost layer having an inner periphery longer than the outer periphery of the layer adjacent thereto to enable removal of said outermost layer from the cable.

13. A method of forming a signal transmitting cable, the method comprising:
    arranging a plurality of elongate, flexible first optical signal transmitting members in at least three rows, wherein for each said row containing a plurality of said members, said members are arranged such that neighbouring members of a row are in touching contact with each other, and each recess formed by neighbouring members of a first said row facing towards a second said row accommodates a respective member of a said second row;
    surrounding said first optical signal transmitting members by a first layer of resin material curable by means of radiation such that only the outermost optical signal transmitting layers are in contact with said first layer, and said first layer is in touching contact with substantially all of the outward facing surface of the first signal transmitting portion;
    curing said first layer by means of radiation; and
    modifying a material forming an outer surface of the cable to facilitate installation into a duct by means of fluid flow.

14. A method according to claim 13, further comprising:
    arranging a plurality of elongate, flexible second optical signal transmitting members around the periphery of said first layer such that each said second signal transmitting member is in touching contact with two adjacent said second optical signal transmitting members; and fixing said second optical signal transmitting members in position relative to said first layer.

15. A method according to claim 14, wherein the step of fixing said second optical signal transmitting members in position relative to said first layer comprises embedding said second optical signal transmitting members in a second layer.

* * * * *